United States Patent [19]

McMurtry

[11] 3,836,958

[45] Sept. 17, 1974

[54] OPTICAL CHARACTER RECOGNITION SCANNING APPARATUS

[75] Inventor: David Harwood McMurtry, Portola Valley, Calif.

[73] Assignee: International Business Machines Corporation, Armonk, N.Y.

[22] Filed: July 3, 1972

[21] Appl. No.: 268,244

[52] U.S. Cl..... 340/146.3 F, 235/61.11 E, 250/227, 250/567

[51] Int. Cl. .............................................. G06k 9/18

[58] Field of Search........ 340/146.3 F; 235/61.11 E; 250/219 D, 227, 233, 235; 350/96 R, 96 B; 355/47, 66

[56] References Cited

UNITED STATES PATENTS

| | | | |
|---|---|---|---|
| 2,930,899 | 3/1960 | Lyon et al. | 340/146.3 F |
| 2,937,283 | 5/1960 | Oliver | 340/146.3 F |
| 3,270,132 | 8/1966 | Richey | 235/61.11 E |
| 3,497,298 | 2/1970 | Watanabe | 355/66 X |
| 3,636,365 | 1/1972 | Houston | 250/227 |
| 3,689,145 | 9/1972 | Kawakubo et al. | 355/66 X |
| 3,699,312 | 10/1972 | Jones et al. | 235/61.11 E |

OTHER PUBLICATIONS

Bruce et al., "Dual-Mirror Document Scanning System," "IBM Tech. Disclosure Bulletin," Vol. 14, No. 6, Nov. 1971, pp. 1,791–1,796.

McMurtry, "IROS," IBM Working Paper–Advanced Systems Development Division, May 12, 1970, 38 pages.

*Primary Examiner*—Paul J. Henon
*Assistant Examiner*—Leo H. Boudreau
*Attorney, Agent, or Firm*—George E. Roush

[57] ABSTRACT

The recognition of human and machine readable characters of a family of type of which each character comprises one or more constrained segments is enhanced by a single element shutter and light conducting and optical image rotating component in an opto-mechanical subassembly for precisely scanning short straight line segments in seriatim. The movable shutter is arranged with apertures in two parallel tracks moving past the field of scan and preferably the apertures are arranged for scanning a multiple of characters for each full movement of the shutter. The apertures for each character are divided into slits and slots with a slit in one track cooperating by way of the image rotating component with a slot in the other track moving in the direction of an image line segment under consideration. Drum, belt and disk shutters are contemplated, and plural image rotating elements and associated sets of aperture tracks are feasible with optical fiber bundles. A moving mirror illuminating and scanning system is also disclosed. Opto-electronic circuitry produces electric representations in response to the presence and absence of character line segments in the image. The basic opto-electronic circuitry comprises a photosensitive diode arranged to receive light from the scanning field of a document and suitable logical circuitry.

25 Claims, 14 Drawing Figures

OPTICAL CHARACTER RECOGNITION SCANNING APPARATUS

The invention relates to optical character recognition apparatus, and it particularly pertains to opto-mechanical means for analyzing characters segment by segment in two directions simultaneously.

In the contemporary alphameric character printing art, attention is being directed to simplified, low cost type recognition apparatus for use in conjunction with data processing systems such as commercial billing systems, and the like, and Computer Assisted Instructional (CAI) systems. In the CAI systems, the use of constrained character printing is particularly helpful as a learning aid in that young children may be developed mentally before they have acquired the manual art of rapidly lettering and writing clearly. The recognition equipment for such characters is valuable in the teaching process in that automatic grading and selection of predetermined course material may be made along predetermined lines, leaving the teacher free to assist the students in more pedagogical ways.

Optical scanning apparatus, character recognition apparatus, and various forms of auxiliary apparatus have been suggested for this and similar purposes. The more pertinent examples of this prior art are to be found in the following U.S. patents:

| | | | |
|---|---|---|---|
| 2,930,899 | 3/1960 | Lyon et al | 250-233 |
| 2,937,283 | 5/1960 | W. C. Oliver | 250-233 |
| 3,016,785 | 1/1962 | N. S. Kapany | 88-1 |
| 3,036,153 | 5/1962 | R. G. Day | 178-7.1 |
| 3,104,324 | 9/1963 | J. Rabinow | 250-227 |
| 3,125,683 | 3/1964 | R. M. Stewart et al | 250-227 |
| 3,170,980 | 2/1965 | D. E. Pritchard | 88-1 |
| 3,177,470 | 4/1965 | A. Galopin | 340-146.3 |
| 3,205,367 | 9/1965 | W. A. Whitesell | 250-235 |
| 3,242,453 | 3/1966 | J. G. Baumberger | 340-146.3 |
| 3,250,172 | 5/1966 | T. C. Abbott, Jr. et al | 88-1 |
| 3,303,739 | 2/1967 | A. K. Chitayat | 88-1 |
| 3,309,669 | 3/1967 | J. H. Lemelson | 340-146.3 |
| 3,435,244 | 3/1969 | C. B. Burckhardt et al | 250-219 |
| 3,497,298 | 2/1970 | M. Watanabe | 355-47 |
| 3,504,958 | 4/1970 | S. Duinker et al | 350-150 |
| 3,507,984 | 4/1970 | G. Stavis | 178-5.4 |
| 3,522,437 | 8/1970 | P. F. Bargh | 250-219 |
| 3,524,928 | 8/1970 | T. A. Hoskins | 178-7.6 |
| 3,554,632 | 1/1971 | A. K. Chitayat | 350-96 |
| 3,631,394 | 12/1971 | J. D. Harr et al | 340-146.3 |

and in the technical literature:

W. E. Goetz and F. L. Hajny, "Optical Systems for Character Recognition:"IBM Technical Disclosure Bulletin Vol. 6 No. 8, January 1964, pp. 122-3.

The aforementioned prior art is concerned with dual element shutters, lossy optical projection systems, complex path splitting optical systems that are also lossy, optical fiber systems requiring one aperture for each character to be recognized and/or one optical fiber bundle especially shaped for each character, less efficient illumination schemes and tubular optical tunnels among other arrangements. All of these are bulky, expensive and/or difficult in adjustment with respect to the arrangements of the invention.

According to the invention, the objects indirectly referred to hereinbefore and those which will appear hereinafter are attained in opto-mechanical character recognition scanning apparatus of simplified construction. The character recognition apparatus according to the invention is adaptable to any constrained writing or printing, particularly that given to short line segment recognition. One example of such are the characters of a family of type in the general format of a parallelogram within a parallelogram as illustrated in U.S. Pat. No. 3,631,394 above mentioned. Conveniently, all of the alphameric characters necessary for a very large variety of applications can be made up of not more than a dozen short straight line segments arranged two-by-two. Such characters are defined as constrained characters based on the format of a medianly quartered parallelogram (MQP) which embraces both slanted and upright printing the latter being a special case in the form of an orthogonally quartered rectangle (OQR) of the 26 letters of the English alphabet and the 10 Arabic numerals. Only a few letters vary much from the conventional, and these are readily recognized upon seeing them in proper context.

According to the invention, the character recognition scanning apparatus comprises a single movable shutter element arranged for the passing of a document relatively thereby. Transparent apertures are arranged in the disk in two substantially parallel tracks and coupled through an optical fiber light conducting device which also effectively rotates the relationship of the apertures in the tracks for uncovering each contingent segment of the character to be scanned.

The apertures in each track are of two general types, denoted slits and slots. A slit in one track cooperates with a slot in the other track. As used hereinafter, the term slit is construed as a short narrow aperture substantially parallel to and moving substantially normally across the line segment being scanned and the term slot is construed as a relatively wider and larger, though still small, aperture substantially parallel to and moving more or less along the line segment being scanned and functioning much as the optical equivalent of an electric gating pulse.

Light from a suitable conventional source is arranged to illuminate the document in the area being scanned and is reflected quantitatively from the background and from the presence or absence of a mark at the point of scan. A conventional photoresponsive device is arranged to intercept the reflected light as passed through the apertures and the optical fiber light conducting device for application to a suitable conventional amplifying circuit at the output of which appears an analog voltage predominantly of two significant levels denoting mark or space, that is the absence of a mark. Light from the same or another suitable source is directed toward timing apertures in a further track on the shutter and thence to another suitable photoresponsive device generating a timing pulse train. The timing pulse train is applied through a conventional amplifying circuit to circuitry for generating conventional control voltages used for synchronizing subsequent circuits. Other conventional timing pulse generating means can be used if desired, however, as the generating of timing pulse waves forms no part of the invention in and of itself.

According to the invention, a document is illuminated as it is scanned by means of a plane mirror arranged normal to the plane of the document and moved thereacross. Light from a conventional light source is projected onto the mirror at an angle at which the area of the document being scanned is illuminated. The movable shutter and a lens are arranged to intercept the light from the document as reflected by the moving mirror. Conventional means are arranged for moving the mirror and the shutter in synchronism. Further, according to the invention, a plurality of characters are scanned simultaneously. In this case, a cylindrical light source is contemplated.

A plurality of optical fiber light conducting devices are contemplated in further embodiments of the invention. In one such embodiment, a plurality of pairs of tracks and a plurality of light conducting devices are arranged to operate in parallel, so to speak, on different aspects of the analysis. In another such embodiment, a plurality of pairs of tracks and a number of light conducting devices are arranged to operate in cascade.

Also, according to the invention, the optical viewing and projecting elements are arranged as a subassembly of the scanning apparatus and are readily removable and replaceable. It is contemplated that several different type families and/or sizes of characters may be recognized by the use of interchangeable shutters in the form of drums, belts, and disks. Because each interchangeable shutter is provided with a timing aperture track, there is no synchronizing problem encounterd in changing shutters.

In order that the advantages of the invention may be readily attained in practice, a description of a preferred embodiment of the invention is given hereinafter, by way of example only, with reference to the accompanying drawing, forming a part of the specification and in which.

Figures 1, 2:
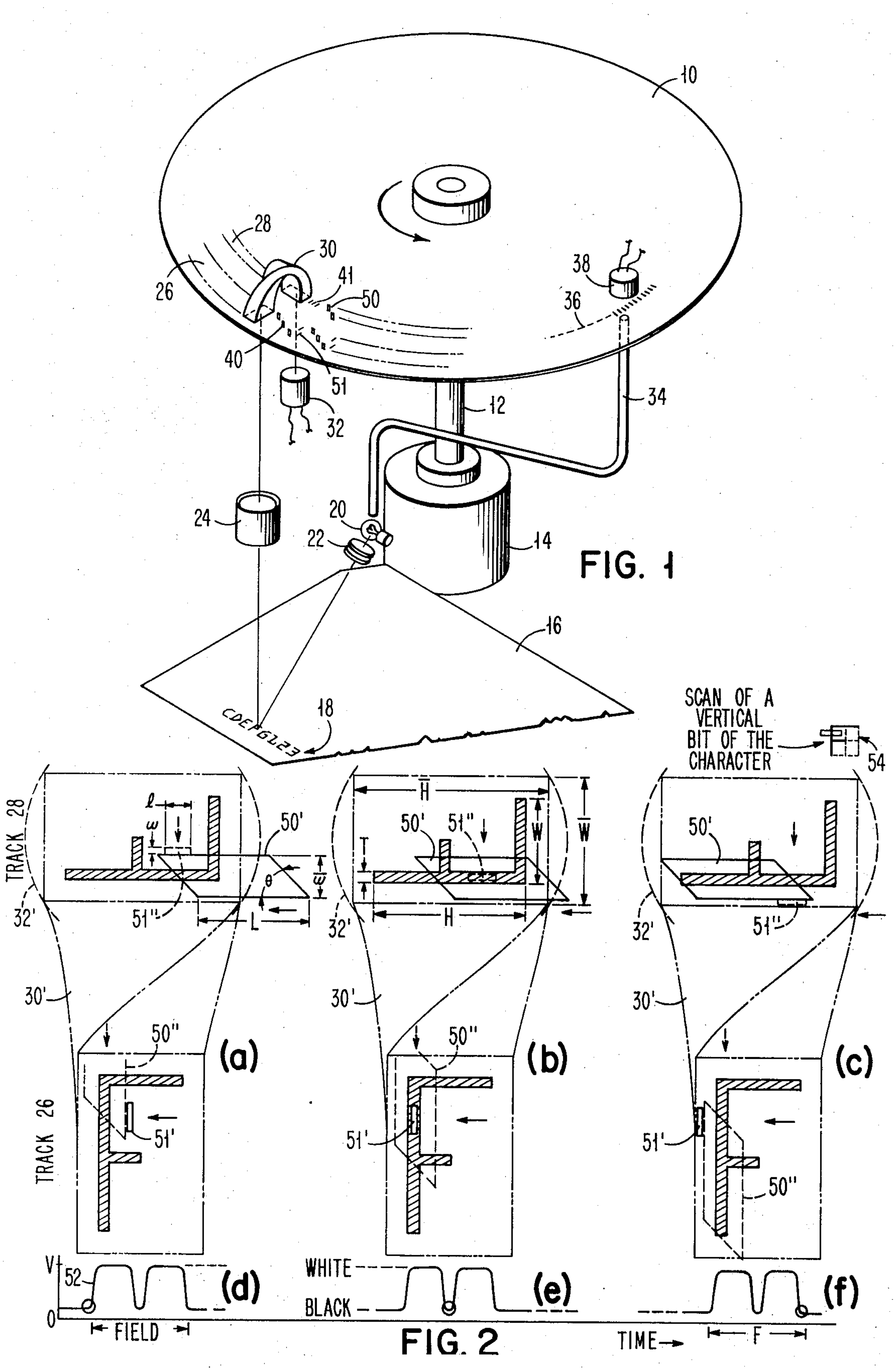
FIG. 1 is a schematic diagram of basic scanning apparatus according to the invention.
FIG. 2 is a diagram illustrating the scanning of one element of a character according to the invention.

A basic arrangement of optical character recognition scanning apparatus according to the invention is schematically shown in FIG. 1. An aperture opaque disk 10 is arranged for continuous uniform rotation on an axle 12 driven by suitable means such as a motor 14, as shown. Beneath the disk 10 there is a document, shown here in the form of a machine record card 16, which is arranged on means (not shown) for relative movement past a predetermined area on the disk 10. The card 16 may bear a large number of characters in rows and columns, as is conventional with machine record cards. Only one short line 18 of characters is shown in the interest of clarity. Although ambient light may be quite sufficient for some applications of the invention, the document 16 preferably is illuminated by a suitable light source indicated here as a lamp 20 and a condensing lens system 22, as optical character recognition apparatus in general functions much better when a stable source of uniform light illuminates both the background and the characters in the foreground. Inexpensive sources of suitable illumination are commercially available. A lens system 24 is arranged for projecting a field about an individual character on the card 16 onto the underside of the apertured disk 10. Around the disk 10 there is a track 26 defined by apertures in the disk 10 spaced apart and dividing the track 26 into a plurality of elements radially of the disk 10. A similar track 28 defined by further optical apertures is concentric to the first track 26. An optical image transmission element in the form of a light conducting element 30, which will be more fully described hereinafter, is arranged adjacent the disk 10 bridging the tracks 26 and 28. Photosensitive means 32, such as one of a number of commercially available photocells, is arranged beneath the disk 10 and the optical image conducting element 30 for receiving light originating from the lamp 20, reflected from the card 16, passing through the projecting lens system 24, an aperture in track 26, the optical image conducting element 30, and an aperture in the track 28.

In many applications, it will be preferred to generate timing pulses for synchronizing steps in the recognition process. As shown, a conventional light pipe 34, made of suitable material, such as glass, or an optical fiber conduit, is arranged to conduct light from the lamp 20 to the underside of the disk 10 adjacent another track 36. The track 36 is made up of apertures conventionally arranged for the timing process. Usually this entails a large number of uniformly spaced apertures, often with additional apertures for sector timing, and in some instances, absence of one or more regularly spaced apertures as is well known to those skilled in the art. The timing aperture track 36 conveniently may be concentric to and intermediate the recognition aperture tracks 26 and 28, as shown. A timing pulse photocell 38 is arranged to receive light passing through the timing apertures in the timing track 36 for producing electric timing pulses in conventional manner.

As stated hereinbefore, the apertures in each track are of two general types, denoted slits and slots. A slot 40 in track 26 cooperates with a slit 41 in track 28 and a slot 50 in track 28 cooperates with a slit 51 in track 26. The slits 41 and 51 are short, narrow apertures substantially parallel to and moving substantially normally across a line segment being scanned while the slots 40 and 50 are relatively wider and larger apertures substantially parallel to and moving more or less along the line segment being scanned, as shown in FIG. 2, illustrating the scanning of one element of a character, according to the invention. In this diagram, the process of scanning the letters F of an OQR type family is depicted. This type family is but one of several particularly suitable for scanning with the apparatus according to the invention. Two versions of this basic type family are illustrated in the hereinbefore listed U.S. Pat. No. 3,631,394. Obviously, a more conventional type character F, either with serifs or "sans-serif" is readily scanned according to the invention.

As stated above, the dimensions of the slits and slots and the contingent line segments are relative. Resolution of the contingent line segment is achieved according to the invention by both slits and slots cooperating jointly but with each having the several capability of resolving the recognition of the contingent line segment. The relationship is alternately expressed as each of the unique pairs of simultaneously cooperating scanning apertures comprising an elongated narrow slot short in length with respect to twice the contingent line segment of a character to be scanned and arranged in one associated track in the shutter to be moved substantially parallel to said contingent line segment as the shutter is moved and an elongated slit narrower and shorter than said slot and arranged in the other associated track in the shutter to be moved substantially normal to said contingent line segment as the shutter is moved.

While the previously mentioned U.S. Pat. No. 3,631,394 illustrates a process of scanning utilizing slits and slots, it should be recognized that the dimensioning according to the instant invention differs considerably and affords optimum, or nearly optimum, operation, as will be discussed hereinafter. The dimensioning of the OQR format and the appropriate slits and slots according to the invention are given in the table below.

TABLE OF DIMENSIONS

| | | |
|---|---|---|
| Heighth | $\bar{H}$ of field | 0.250" |
| Width | $\bar{W}$ of field | 0.200" |
| Heighth | H of character | 0.166" |
| Width | W of character | 0.133" |
| Thickness | T of line | 0.008" |
| Width | $\bar{w}$ of slot | 0.067" |
| Length | L of slot | 0.100" |
| Angle | $\theta$ of slot | 45° |
| Width | w of slit | 0.005" |
| Length | l of slit | 0.031" |

With a disk arrangement as thus far described, the two recognition tracks 26, 28 may be considered essentially parallel for relatively large disks, implying that the tracks are defined by relatively large and closely equivalent radii. In practice, however, the disk version of character recognition scanning apparatus is used for mechanism wherein simplicity and compactness are highly desirable. In such applications, the optimum dimensions and configurations of the slits and slots in the two recognition tracks differ from the nominal and differ in the individual tracks in order to accommodate the differences in given angles, radii and chord. Such considerations are deemed to be completely within the skill of the artisan.

Similarly, variations of design are preferably employed as between slant and upright versions of the same type family. The choice of slant and upright versions is usually made on considerations involving human factors; reading one version may be easier and lettering is usually easier on the "inclined" style corresponding to slant printing than in the "vertical" style which corresponds to the upright printing version.

Referring to FIG. 1, the optical image conducting element 30 comprises a bundle of optical fibers coherently arranged in the bundle for conducting an image from one end to the other without distortion, except that the bundle is twisted through a predetermined angle, shown here as substantially 90°, whereby an image originating at one end of the bundle is rotated through that angle (90° in the example) in the same plane at the other end of the bundle. As shown, the optical image conducting bundle 30 is arranged on one side of the disk 10, but it is contemplated that in some applications, those skilled in the art may shape the bundle with the ends thereof on opposite sides of the disk and lying in planes substantially parallel to each other. The bundle then is formed in a substantially C-shaped configuration. Alternatively, the bundle 30 may be circular in cross section or of some other desired cross section, rather than rectangular as shown. Such optical imaging optical fiber bundles are readily manufactured by conventional methods.

The disk 10 with the apertures 40, 41, 50, 51 is arranged for sequentially uncovering each of a predetermined number of areas in each character for which the particular disk is designed. The photoresponsive element 32 is arranged to deliver a potential of two levels, one corresponding to a mark and the other corresponding to the background or the absence of a mark. Preferably, a small compact integrated circuit amplifier is located near the photocell 32 and the output voltage and current from the photocell 32 is transmitted by means of the convenient light-weight cable to electronic circuitry such as that described in U.S. Pat. No. 3,599,151 issued on the 10th of Aug., 1971 to Jerome Danforth Harr for "Character Recognition Photosensing Apparatus having a Threshold Comparator Circuit." The areas of the fields continuously scanned are sequentially sensed by the photoresponsive element 32 as the slots and slits cooperate through the arrangement of the image rotating transmission element 30. In an optical sense, the slits and slots move normally to each other by the proper design thereof so that orthogonal scanning is approximated by the peripheral curvilinear motion of the disk just as though the tracks were substantially parallel to each other.

Referring to FIG. 2, there is an output wave 52 of the photocell 32 represented in voltage on the ordinate against time on the abscissa at three significant portions of the scan for one vertical element. Corresponding diagrams of the character being scanned and the relative locations of a pair of cooperating slits and slots are shown as though displayed on the two faces of an image rotating element 30'. The active area of the photosensitive device is represented by a broken line 32' and the optical image conducting element by the chain line. The five segments of the character F, as indicated in the format block 54 are shown in solid lines. The effective slot is shown at one end of the rotator 30' in solid lines 50' and at the other end of the image rotator 30' in dotted lines 50'' with the adjacent arrow indicating the relative motion with respect to the character segments. In the waveform 52, a large voltage drop results when the small slit is superimposed completely over a black line.

To date, the primary problems lie in positioning small characters relative to the scanning element, as for example, misalignment due to slight variations in typewriter accuracy occurring upon typing the document. Secondary problems relate to changes in document size due to environmental differences occurring between the time of generation and the time of scanning, and/or misregistration of the document with respect to the scanning mechanism itself. The smaller the physical size of the character, the more critical these problems are. Because of these situations, the prior art mechanisms typically are arranged to allow a large vertical positioning tolerance without any limitation on horizontal positioning tolerance. With the arrangement according to the invention, as hereinbefore described, these inherent problems are overcome in the arrangements to be described hereinafter.

Further according to the invention, two modes of scanning are employed in sequence to compensate for these tolerances. A "search mode" scan is arranged to first determine the horizontal and vertical position to the character, and a "recognition mode" scan is then arranged to perform the necessary scans for identifying the character. The advantage of separate scans for searching and for recognition lies in the convenience of using different shaped apertures for the two modes. Thus, the disk 10 is alternatively provided with two groups of apertures for the two individual scans. Preferably, three or more sectors are provided on each disk of the scanning arrangement as described with each sector being provided with sufficient apertures for locating and scanning one character. With two sets apertures per sector, six subsectors, are then arranged with apertures corresponding to the type of scan and to the character on each disk. It is contemplated according to the invention that plural optical image conducting elements with corresponding scanning tracks be provided for the separate modes. The disk arrangement, as hereinbefore described, lends itself well to this purpose. With disks, the tracks of fewer apertures are better located toward the center of the disk from the tracks having more apertures.

Figure 3:
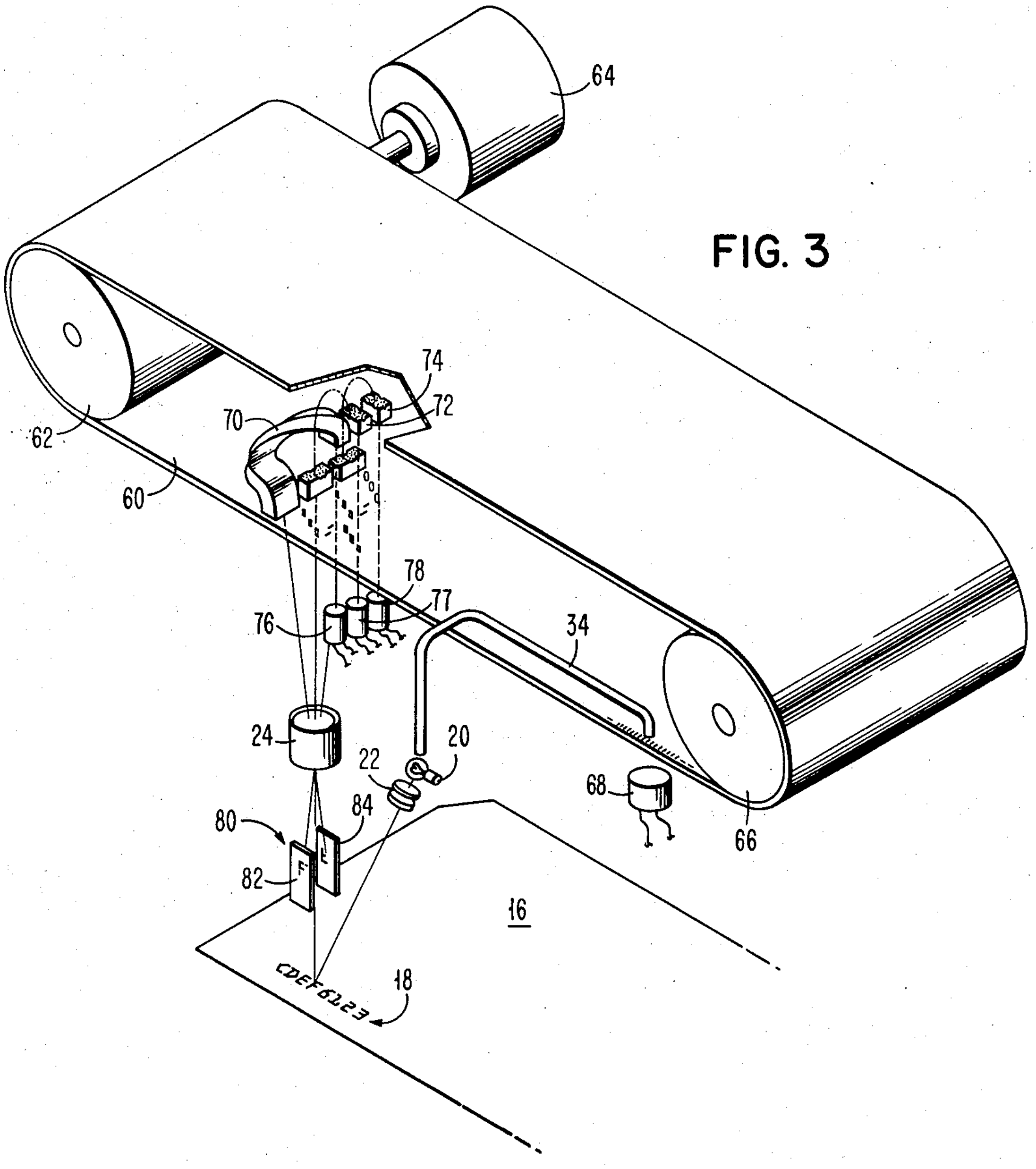
FIG. 3 is a schematic diagram of scanning apparatus having parallel tracks of apertures and plural optical image conducting and rotating elements.

An alternate embodiment is shown in FIG. 3. Components corresponding to the disk arrangement are given like reference numerals in the interest of clarity. The moving shutter element is shown here in the form of a belt 60 of Mylar* or similar material having an opaque coating which is provided with apertures in the coating, or punched through the belt as before, but arranged in exactly parallel tracks, whereby the individual apertures are of the same size and configuration across the belt. The belt 60 is supported by two drums, one 62 of which is rotated by a motor 64 and the other drum 66 is arranged for maintaining the belt taut by conventional means (not shown). It is also contemplated that conventional means (not shown) be arranged to move the drum 66 toward the drum 62 for permitting ready interchange of different belts for different type families. Again, a timing aperture track is arranged, preferably along one edge of the belt 60, as shown. The light pipe 34 may be brought up to the underside of the belt 60 and a photosensitive transducer 68 may be arranged in between the webs of the belt; however, it is suggested that photosensing device 68 may be part of a circuit board arranged under the belt and the light pipe bent over the belt as shown.

*Registered Trademark of E. I. duPont de Nemours & Co., Inc.

Three optical image conducting and rotating elements 70, 72 and 74 are arranged as before over corresponding tracks of apertures as shown. Three photosensitive devices 76, 77 and 78 are arranged beneath the belt preferably on a circuit board (not shown) on which suitable amplifiers are also located. An image of each character to be recognized must be projected to one end of the three optical image conducting and rotating devices 70, 72, 74. This may be accomplished by using individual lenses, but, according to the invention, a multiple image generating assembly 80 is preferably used. The assembly 80 comprises two plane parallel mirrors 82, 84 operating much in the form of an optical tunnel, but being far easier to adjust initially and to maintain in adjustment over the course of time.

Figure 4:
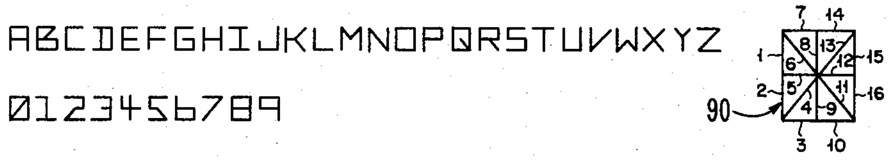
FIGS. 4 & 5 illustrate two constrained type families having diagonal lines recognizable by apparatus according to the invention.
Figure 5:
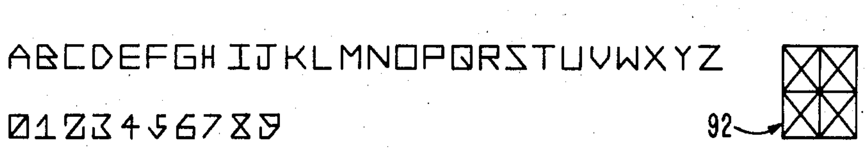

The search mode scan is arranged to determine the location of the character to be recognized in both the vertical and horizontal directions. The apparatus is arranged to search for each character a number of times as the character moves under the shutter. Small circular apertures are preferred for this function. The search scan principles are applicable to many forms of constrained type families. In addition to the OQR constrained type family hereinbefore mentioned, and the well known OCR-A type family, a type family having four diagonal segments in the format 90 is illustrated in FIG. 4 and another type family having eight diagonal segments in the format 92 is illustrated in FIG. 5. The search scanning operation will be described with reference to a character A which is common to both the OQR type family and the more conventional four-diagonal type family above mentioned.

Figure 6:
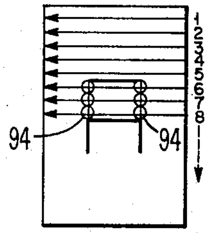
FIGS. 6–9 illustrate the determination of vertical and horizontal positioning of a character with apparatus according to the invention.
Figure 7:

As shown in FIG. 6, the apparatus is arranged to make several sequentially numbered horizontal sweeps in order to determine the vertical character position in space. As shown, the sixth sweep is the first one to intersect the top of the character. The intersections are indicated by the small circular apertures 94. This sweep is a known fixed distance from the top of the scanning field. Thus, the position of the top of the character is known and can be stored. However, this intersection may have been a blot of ink or other dirt on the document. To verify that the sixth sweep represents the top of the character, the apparatus is arranged so that the seventh and eighth sweeps must also register intersections. Thus, the mark detected is considered sufficiently long to be considered a segment of the character. It does not matter where the sixth sweep intersects a line or how many times it intersects; it only matters that the sixth sweep is the first one to begin detecting black marks. This vertical search can be carried out because every character has at least one upper vertical bit, as shown in FIG. 7. As long as the scan sweep intersects at least one of these bits, the vertical position will be determined.

Figure 9:
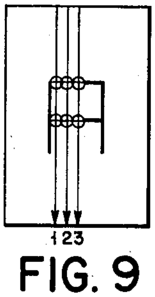
Figure 8:

The horizontal position of the character A changes with time as the document moves past the moving shutter element. The apparatus is arranged to make a vertical sweep looking for any one of the three lefthand horizontal segments of the character, as shown in FIG. 8. The mechanism is also arranged so that the horizontal search scan determines when the character has advanced sufficiently far under the shutter to be in position for the recognition mode scan. To prevent dirt on the document from generating spurious signals, the first intersection is again verified by two more intersections, as shown in FIG. 9. This assures that the black mark detected is sufficiently long to be considered a segment of the character. Logical circuitry (not shown) is arranged to switch to the recognition mode of operation only after the vertical sweep indicates that the character is in correct horizontal position. For both the horizontal and vertical search scans, only counting circuitry is required; there is no need for complex timing circuits such as are used in conventional optical character recognition devices. Likewise, the recognition scan logical circuit is arranged to utilize the concept of shared fields. Only those fields which will be used for recognition are assigned field numbers in accordance with the contingent location of the character segments. The fields which have no expected field numbers assigned for the particular segment of the type family under investigation are, of course, scanned by the apparatus, but the output is simply ignored. In many applications, the apparatus is arranged to recognize three possible character positions to provide for the complete vertical tolerance. Shared fields with variable field numbers allow a minimum number of scans to cover the complete field. In the logical operation, the vertical search scan that detects the top of the character assigns the sequence number to the appropriate fields.

In any optical recognition apparatus, a problem arises in determining where a given character ends and the next one begins. In apparatus according to the invention, the search scan is used to determine the end of a character as well as the beginning, whereby the recognition scanning mode can be controlled in accordance with the spacing between characters; the logic circuitry is arranged to determine the end-of-character as being the first time after character recognition when three vertical sweeps fail to intersect a line element.

Figure 10:
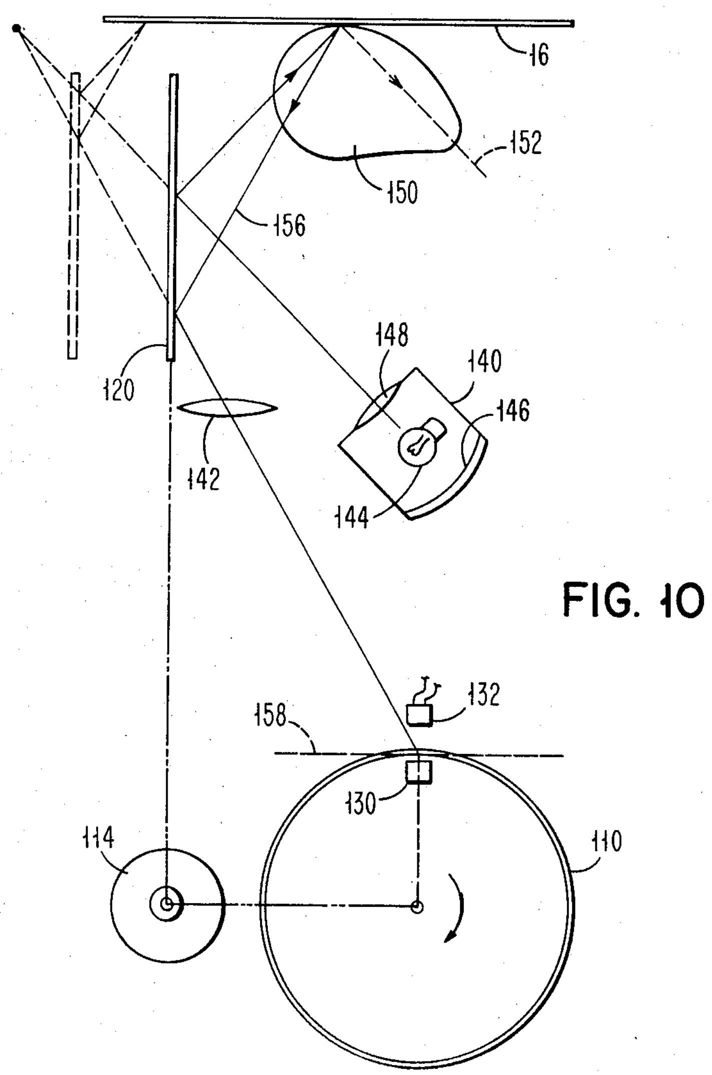
FIG. 10 is a schematic diagram of scanning apparatus according to the invention wherein the document is stationary and scanned by a moving mirror.

FIG. 10 is a schematic diagram of scanning apparatus according to the invention which uses a rotating drum 110 as a shutter and which is arranged to scan a document 16 fixed in position. The document 16 is laid face down on a transparent table, for example, and roughly positioned as by means of a conventional L-shaped guide (not shown). The drum 110 is driven by a motor 114 in conventional manner. The motor 114 also moves a mirror 120 in synchronism with the rotation of the drum 110; no servo system is required as the tolerances are wide. A bank 130 of optical image conducting rotating elements is arranged inside the drum as close as is practically possible for allowing rotation of the drum and removal thereof for accommodating more than one type family. A bank 132 of photosensitive devices is located externally of the drum at the ends of the pertinent optical conduction and rotation elements 130. A light source 140 and a lens 142 complete the essentials of the apparatus. With a drum arrangement, a number of lines of characters can be scanned simultaneously, so preferably, the light source 140 comprises a cylindrical lamp 144, a cylindrical reflector 146, and a cylindrical illumination lens 148. The light source 140 is arranged with respect to mirror 120 so that light is reflected onto the document 16 along the line, or lines, of characters being scanned. A polar plot of light intensity against the angle of observation is indicated by the line 150 while the broken line 152 indicates the light beam as reflected from the document 16. The intensity is highest along line 152 and therefore the lowest contrast is afforded along that line. The ray of light from the document 16 which is reflected by the mirror 120 to the drum 130 is indicated by the line 156. Note that the polar plot for the ray 156 is low in value at the point of intersection; hence, an indication of high contrast for better resolution in the photosensitive device 132.

The plane of the lens 142 is parallel to the plane of the document 16 and parallel to a line 158 tangent to the drum 110. This parallel alignment ensures a distortion free image at the projection line on the drum 110. The mirror, cylindrical light source and illuminating lens each are as long substantially as the document 16 is wide. This arrangement is particularly applicable to wide documents and scanning apparatus for recognizing multiple lines of characters simultaneously.

The arrangement is also particularly well suited for use in electrophotographic apparatus wherein the drum 110 would be replaced by a drum having photoresponsive material, such as selenium, thereon for the translation of light values over the entire area of the document to the drum and subsequent transfer to copy paper.

Figure 11:
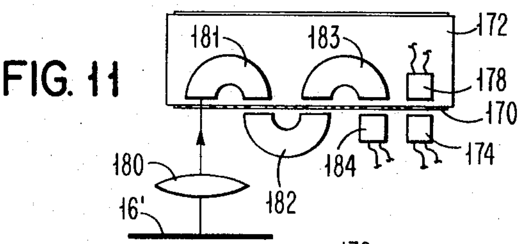
FIG. 11 is a schematic diagram of an alternate embodiment according to the invention having parallel tracks and multiple optical image transmitting and rotating elements.
Figure 13:
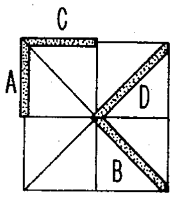
FIG. 13 is an illustration of the segment format of one type family for ease in understanding the operation of the embodiment shown in FIGS. 11 and 12.
Figure 12:
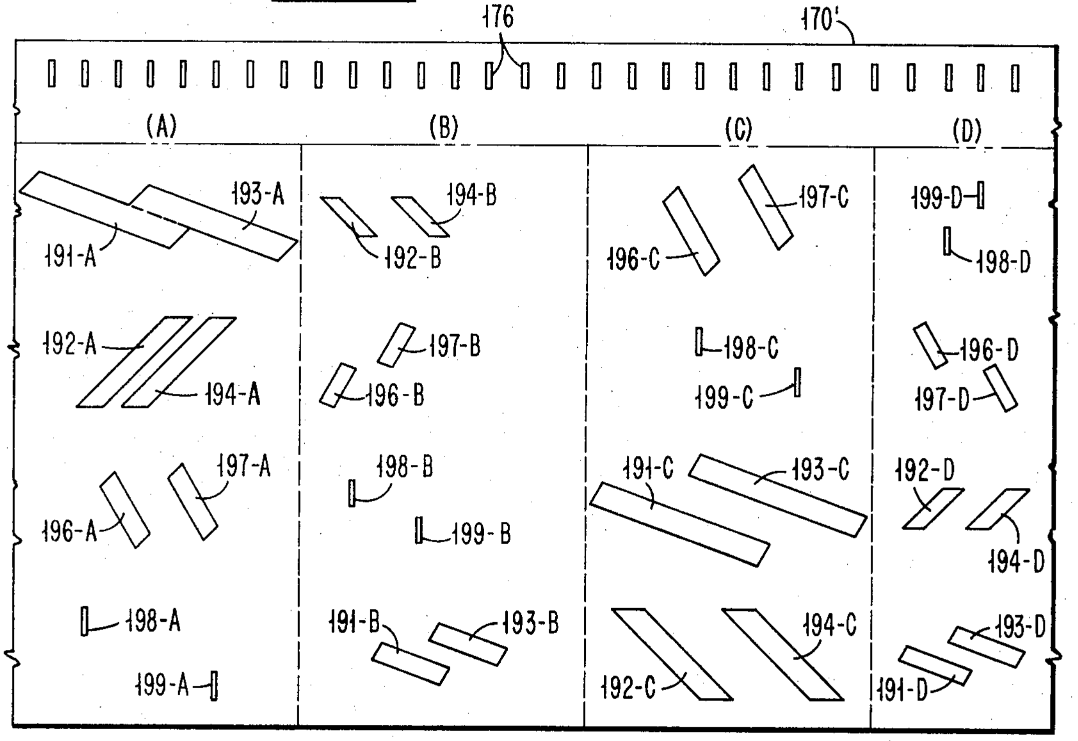
FIG. 12 is a schematic dagram of a sector of a belt as employed in the arrangement of FIG. 11.
Figure 14:
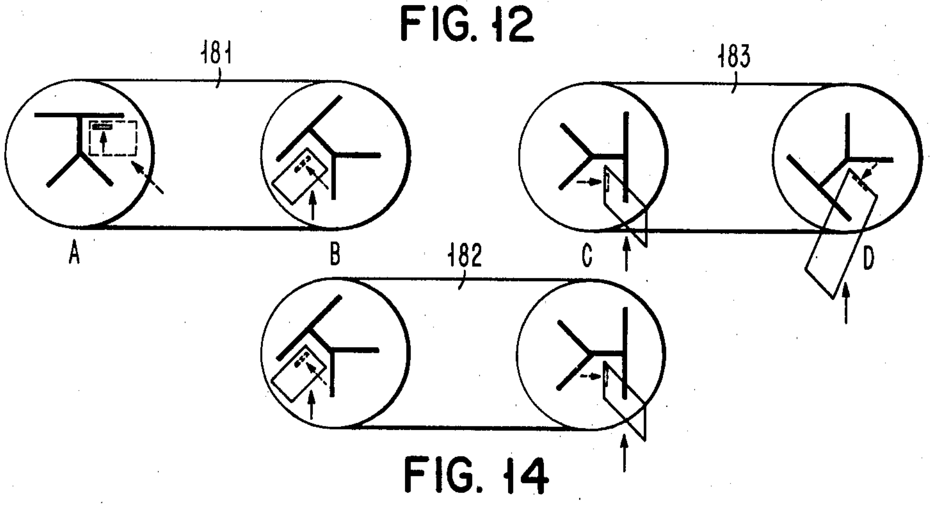
FIG. 14 is an explanatory diagram illustrating aspects of the operation of the embodiment shown in FIGS. 11 and 12.

An alternate embodiment of the invention is shown in FIG. 11. A belt 170 (shown in cross-section) moving over one drum 172 (of a pair of drums) has four tracks substantially parallel to each other of recognition apertures and a timing track of apertures 176. A source of light 174 illuminates the timing track for passing light through the apertures 176 to a photosensitive device 178, thereby developing a timing pulse train. Light reflected from a document 16' is focused, as by a lens 180, onto one of the recognition aperture tracks. Three optical image conducting and rotating elements 181, 182 and 183 are arranged for conducting light from the first track, through each of the tracks in turn onto a photosensitive device 184 provided there are apertures in each of the four tracks. A plan view of a sector 170' is shown in FIG. 12. This sector is designed for analyzing fields A, C, D and B of a conventional constrained character of square format as shown in FIG. 13. In this sector design, windows 191–197 are provided in two tracks for holding the light path open during movement of the corresponding slit across the character segment being analyzed. Those skilled in the art will design the slits 198, 199 for minimum dimensions for the application at hand in order to eliminate any possible extraneous light variations. The operation of the arrangement shown in FIGS. 11 and 12 will be more clearly understood from the diagram of FIG. 14. Here, the images of a letter are shown as they appear at the faces of the light conducting and rotating elements 181, 182 and 183, looking at the belt 170 from the document side in all instances. The elements 181–183, as shown, are arranged to rotate the image 45°, an angle rendering the analysis of character segments lying at diagonally, or approximately 45°, to the vertically and horizontally extending segments. In this example, the optimum minimal dimensioned slits and slots are shown, for the particular segment of the character under consideration, as they will develop optically on the field in which the character segment appears; that is, the apertures 196–199 in the belt are configured to result in the slits 198', 199' and slots 196', 197' depicted and, thus, are not necessarily identical to the virtual slits and slots as shown in FIG. 14. The difference is a matter of dynamic descriptive geometry well within the skill of the artisan. Those skilled in the art will readily adopt the teaching to drum and disk shutters which require simple reshaping because of curvature. Computer aided design procedures preferably will be used, especially with extensive type families, including arbitrary symbols.

While the invention has been shown and described particularly with reference to preferred embodiments thereof and various alternative structures have been suggested, it should be clearly understood that those skilled in the art may effect further changes without departing from the spirit and scope of the invention as defined hereinafter.

The invention claimed is:

1. Optical character recognition scanning apparatus comprising, a movable shutter having therein a multiple of pairs of simultaneously cooperating scanning apertures corresponding to line segments of characters to be recognized arranged in separate associated substantially parallel tracks, each of said simultaneously cooperating scanning apertures having at least one dimension which is less than the length of a contingent line segment of a character to be scanned, means for continuously moving said shutter, means for linearly moving a document bearing characters to be recognized relative to said shutter, optical means for imaging a field on said document onto one of said tracks of apertures at one side of said shutter, photosensitive means arranged at one side of said shutter adjacent the other of said tracks of apertures, and an optical image conducting element having one end at a side of said shutter directly opposite said field imaging means and having the other end at a side of said shutter directly opposite said photosensitive means and arranged for rotating the image as seen through one cooperating scanning aperture in one track in said shutter by a predetermined angle for transmission through the other cooperating scanning aperture in the other track in said shutter.

2. Optical character recognition scanning apparatus as defined in claim 1 and wherein said predetermined angle is substantially 90°.

3. Optical character recognition scanning apparatus as defined in claim 1 and wherein said optical image conducting element comprises a bundle of optical fibers.

4. Optical character recognition scanning apparatus as defined in claim 3 and wherein the end faces of said bundle of optical fibers lie in the same geometrical plane.

5. Optical character recognition scanning apparatus as defined in claim 3 and wherein the end faces of said bundle of optical fibers are substantially rectangular.

6. Optical character recognition scanning apparatus as defined in claim 3 and wherein said shutter comprises a tubular element having apertures in a plurality of tracks concentric with respect to the tubular axis thereof.

7. Optical character recognition scanning apparatus as defined in claim 6 and wherein said tubular element comprises a belt of flexible material having a plurality of tracks substantially parallel to each other peripherally of the tubular axis thereof.

8. Optical character recognition scanning apparatus as defined in claim 6 and wherein said tubular element comprises a drum of rigid material having concentric tracks peripherally of the longitudinal axis thereof.

9. Optical character recognition scanning apparatus as defined in claim 3 and wherein said movable shutter comprises a disk having concentric tracks about the axis normal to the plane of the disk.

10. Optical character recognition scanning apparatus as defined in claim 1 and wherein said predetermined angle is substantially 45°.

11. Optical character recognition scanning apparatus comprising, a rotatable disk having therein a multiple of pairs of simultaneously cooperating scanning apertures corresponding to line segments of characters to be recognized arranged in separate concentric annular tracks, each of said pairs of simultaneously cooperating scanning apertures comprising an elongated narrow slot short in length with respect to twice the contingent line segment of a character to be scanned and arranged in one associated track in the disk to be moved substantially parallel to said contingent line segment as the disk is rotated and an elongated slit narrower and shorter than said slot and arranged in the other associated track in the disk to be moved substantially normal to said contingent line segment as the disk is rotated, means for continuously rotating said disk, means for linearly moving a document bearing characters to be recognized relative to said disk, optical means for imaging a field on said document onto one of said tracks of apertures at one side of said disk, photosensitive means arranged at one side of said disk adjacent the other of said tracks of apertures, and an optical image conducting element comprising a bundle of optical fibers having one end at the other side of said disk directly opposite said field imaging means and having the other end located at the other side of said disk directly opposite said photosensitive means and arranged for rotating the image as seen through one cooperating scanning aperture in one track in said disk by a predetermined angle for transmission through the other cooperating scanning aperture in the other track in said disk.

12. Optical character recognition scanning apparatus comprising, a movable shutter having therein a multiple of pairs of simultaneously cooperating scanning apertures corresponding to line segments of characters to be recognized arranged in a number of pairs of separate associated substantially parallel tracks, each of said pairs of simultaneously cooperating scanning apertures comprising an elongated narrow slot short in length with respect to twice the contingent line segment of a character to be scanned and arranged in one associated track in the shutter to be moved substantially parallel to said contingent line segment as the shutter is moved and an elongated slit narrower and shorter than said slot and arranged in the other associated track in the shutter to be moved substantially normal to said contingent line segment as the shutter is moved, means for continuously moving said shutter, means for linearly moving a document bearing characters to be recognized relative to said shutter, optical means for imaging a field on said document onto one track of each pair of said associated tracks of apertures at one side of said shutter, a number of photosensitive means each arranged at one side of said shutter adjacent the other of said tracks of apertures, and a number of optical image conducting elements each having one end at a side of said shutter directly opposite said field imaging means and having the other end at a side of said shutter directly opposite a corresponding one of said photosensitive means and arranged for rotating the image as seen through one cooperating scanning aperture in one associated track in said shutter by a predetermined angle for transmission through the other cooperating scanning aperture in the other track in said shutter.

13. Optical chracter recognition scanning apparatus as defined in claim 12 and wherein said optical means comprises an assembly including a pair of plane mirrors arranged parallel to each other, at least one lens arranged with the optical axis thereof on line midway between said mirrors, and said assembly being arranged for producing a plurality of identical images of a field located on said line at a point beyond said mirrors and remote from said lens.

14. Optical character recognition scanning apparatus as defined in claim 11 and incorporating a table on which a document to be scanned is placed in optical projecting relationship to said shutter on which an image of said document is to be projected as it is scanned, the line of projection on said shutter being parallel to the plane of said table, a plane mirror arranged at a predetermined angle to said table for movement in a line parallel to the plane of said table, a light source arranged with respect to the plane of said mirror for illuminating a line on said document through reflection by said mirror, and a lens arranged with the plane thereof parallel to the plane of said table and between said mirror and said shutter for focussing said illuminated line on said document onto said shutter.

15. Optical character recognition scanning apparatus as defined in claim 14 and wherein said lens is a cylindrical lens.

16. Optical character recognition scanning apparatus as defined in claim 14 and incorporating a condensing lens interposed between said light source and said mirror.

17. Optical character recognition scanning apparatus as defined in claim 14 and incorporating a pair of plane mirrors arranged parallel to each other and interposed between said lens and said document.

18. Optical character recognition scanning apparatus as defined in claim 17 and wherein said predetermined angle is 90°.

19. Optical character recognition scanning apparatus comprising, a movable shutter having a multiple of simultaneously cooperating scanning apertures therein arranged in at least three substantially parallel associated tracks and at least one timing aperture track associated therewith, means for continuously moving said shutter, means for moving a document bearing character to be recognized relative to said shutter, means for optically imaging a field on said document onto one track of said associated tracks at one side of said shutter, one optical image conducting and rotating element arranged at the other side of said shutter with one end at said one track and the other end at another track, another optical image conducting and rotating element arranged in cascade with said one image conducting element at a side of said shutter with one end opposite another of said tracks and having the other end arranged at an ultimate track, said cascaded image conducting and rotating elements being arranged for rotating the conducted image through a predetermined angle, and photosensitive means arranged at a side of said shutter directly opposite said other end of said other image conducting element at said ultimate track.

20. Optical character recognition scanning apparatus as defined in claim 19 and wherein three of said optical image conducting elements are arranged in cascade and there are four tracks of simultaneously cooperating scanning apertures.

21. Optical character recognition scanning apparatus as defined in claim 20 and wherein apertures are arranged in at least one track intermediate the cascaded optical image conducting and rotating elements for determining the absence and presence of diagonal segments only, and said image rotating elements are arranged for rotating the image by a predetermined angle substantially one half the total angle.

22. Optical character recognition scanning apparatus as defined in claim 20 and wherein said predetermined angle is substantially 45°.

23. Optical character recognition scanning apparatus comprising, a movable shutter having a multiple of pairs of simultaneously cooperating scanning apertures therein arranged in at least four substantially parallel associated tracks and at least one timing aperture track associated therewith, each of said simultaneously cooperating scanning apparatus having at least one dimension which is less than twice that of a contingent line segment of a character to be scanned, means for continuously moving said shutter, means for moving a document bearing character to be recognized relative to said shutter, means for optically imaging a field on said document onto one track of said associated tracks at one side of said shutter, an optical image conducting and rotating element arranged at the other side of said shutter with one end at said one track and the other end at another track, another optical image conducting and rotating element arranged at said one side of said shutter with one end at said other track opposite the other end of the first said conducting element and having the other end arranged at a further track, a further optical image conducting and rotating element arranged at said other side of said shutter with one end opposite said other end of said other conducting element and having the other end arranged at a final track, and photosensitive means arranged at said one side of said shutter opposite said other end of said further conducting element.

24. Optical character recognition scanning apparatus as defined in claim 23 and wherein said optical image conducting and rotation elements are alike.

25. Optical character recognition scanning apparatus as defined in claim 23 and wherein said optical image conducting and rotating elements are circular in cross-section.

* * * * *